United States Patent
Manasseh et al.

(10) Patent No.: US 10,710,220 B2
(45) Date of Patent: Jul. 14, 2020

(54) WAVEFORM SHAPING IN POWER TOOL POWERED BY ALTERNATING-CURRENT POWER SUPPLY

(71) Applicant: Black & Decker Inc., New Britain, CT (US)

(72) Inventors: Alexander Manasseh, Cockeysville, MD (US); Scott J. Eshleman, Parkville, MD (US); Robert A. Usselman, Forest Hill, MD (US); John D. Cox, Lutherville, MD (US)

(73) Assignee: Black & Decker Inc., New Britain, CT (US)

( * ) Notice: Subject to any disclaimer, the term of this patent is extended or adjusted under 35 U.S.C. 154(b) by 87 days.

(21) Appl. No.: 15/481,838

(22) Filed: Apr. 7, 2017

(65) Prior Publication Data
US 2018/0290270 A1    Oct. 11, 2018

(51) Int. Cl.
*B25B 21/00*    (2006.01)
*H02P 6/00*    (2016.01)
(Continued)

(52) U.S. Cl.
CPC .............. *B25B 21/00* (2013.01); *B23B 45/02* (2013.01); *H02P 6/00* (2013.01); *H02P 6/08* (2013.01);
(Continued)

(58) Field of Classification Search
CPC . B25B 21/00; H02P 6/157; H02P 6/32; H02P 6/08; H02P 6/20; H02P 6/24; B23B 6/08
(Continued)

(56) References Cited

U.S. PATENT DOCUMENTS

| 4,855,652 A * | 8/1989 | Yamashita | .......... | H02M 1/4225 |
| | | | | 318/268 |
| 9,406,915 B2 * | 8/2016 | White | ................. | H01M 2/1022 |

(Continued)

FOREIGN PATENT DOCUMENTS

| CN | 103580558 A * | 2/2014 | |
| DE | 102016115799 A1 * | 5/2017 | ............. B25B 21/02 |

(Continued)

OTHER PUBLICATIONS

Extended EPSR dated Oct. 27, 2017 issued in corresponding EP application No. 17168358.4.

*Primary Examiner* — Eduardo Colon Santana
*Assistant Examiner* — Devon A Joseph
(74) *Attorney, Agent, or Firm* — Amir Rohani

(57) ABSTRACT

A power tool is provided including a brushless DC (BLDC) motor, a rectifier that receives an alternative current from a power supply and outputs a rectified signal supplied to a DC power bus, and an inverter circuit having motor switches connected electrically between the DC power bus and the motor. A control module controls a switching operation of the power switches to regulate supply power from the power supply to the motor. The control module controls the switching operation so as to, within a half cycle of the AC power supply voltage waveform, increase current draw from the power supply from a first threshold at or after a first zero-crossing of the half cycle up to a second threshold, and reduce current draw from the power supply from the second threshold up to a third threshold at or prior to a second zero-crossing of the half cycle.

18 Claims, 14 Drawing Sheets

(51) Int. Cl.
  *H02P 23/26* (2016.01)
  *H02P 6/15* (2016.01)
  *H02P 6/32* (2016.01)
  *B23B 45/02* (2006.01)
  *H02P 6/08* (2016.01)
  *H02P 6/20* (2016.01)
  *H02P 6/24* (2006.01)

(52) U.S. Cl.
  CPC .............. *H02P 6/157* (2016.02); *H02P 6/20* (2013.01); *H02P 6/24* (2013.01); *H02P 6/32* (2016.02); *H02P 23/26* (2016.02); *H02P 2207/05* (2013.01)

(58) Field of Classification Search
  USPC .................................................. 318/400.26
  See application file for complete search history.

(56) References Cited

U.S. PATENT DOCUMENTS

| | | | | |
|---|---|---|---|---|
| 9,583,745 | B2* | 2/2017 | White | H01M 2/1022 |
| 9,583,793 | B2* | 2/2017 | White | H01M 2/1022 |
| 9,871,484 | B2* | 1/2018 | White | H02J 7/02 |
| 2008/0304189 | A1* | 12/2008 | Tang | H02H 7/0838 |
| | | | | 361/33 |
| 2013/0106460 | A1* | 5/2013 | De Cock | G01R 31/343 |
| | | | | 324/765.01 |
| 2014/0210379 | A1* | 7/2014 | Kato | H02P 6/153 |
| | | | | 318/139 |
| 2014/0225545 | A1* | 8/2014 | Becerra | H02P 23/26 |
| | | | | 318/400.26 |
| 2016/0020443 | A1* | 1/2016 | White | H02J 7/0022 |
| | | | | 318/245 |
| 2016/0336558 | A1* | 11/2016 | White | H01M 2/1061 |
| 2016/0336559 | A1* | 11/2016 | White | H02J 5/00 |
| 2017/0126051 | A1* | 5/2017 | Cox | H01M 2/1022 |
| 2017/0149372 | A1* | 5/2017 | White | H01M 10/425 |
| 2018/0076651 | A1* | 3/2018 | Cox | H02J 7/0022 |
| 2018/0076652 | A1* | 3/2018 | Cox | H02J 7/0024 |
| 2018/0076653 | A1* | 3/2018 | Forster | H01M 10/4207 |
| 2018/0076745 | A1* | 3/2018 | Cox | H02M 3/10 |
| 2018/0076754 | A1* | 3/2018 | White | H02J 7/0024 |
| 2018/0090978 | A1* | 3/2018 | Forster | H01M 10/0445 |
| 2018/0090979 | A1* | 3/2018 | Forster | H01M 2/34 |

FOREIGN PATENT DOCUMENTS

| | | | | |
|---|---|---|---|---|
| EP | 1465333 | | 10/2004 | |
| EP | 2765703 | | 8/2014 | |
| EP | 3235119 | A1 * | 10/2017 | ............ H02P 6/15 |
| WO | WO-2008129899 | A1 * | 10/2008 | ............ B25F 5/00 |
| WO | WO-2016100879 | A1 * | 6/2016 | ............ H02P 6/15 |

* cited by examiner

WAVEFORM SHAPING IN POWER TOOL POWERED BY ALTERNATING-CURRENT POWER SUPPLY

FIELD

This disclosure relates to control schemes for driving a brushless DC motor in a power tool, and in particular to driving a brushless DC motor from an AC power supply.

BACKGROUND

Power tools may be of different types depending on the type of output provided by the power tool. For example, a power tool may be a drill, hammer, grinder, impact wrench, circular saw, reciprocating saw, and so on. Some power tools may be powered by an alternating current (AC) power source or a direct current (DC) power source such as a battery pack. In power tools using a brushless DC (BLDC) motor, a series of electronic switches are used to electronically energize motor windings sequentially in order to drive the motor rotor. Using these switches, the speed and rotational direction of the rotor can be controlled.

In power tools having brushless DC motors powered by an Alternating Current (AC) power source, a rectifier circuit is often employed to convert negative portions of the current waveform to positive current needed to drive the motor. Using motor control schemes conventionally used with DC power sources, which have a nearly-linear voltage waveform, encounters challenges when used on power tools powered by AC power sources. These challenges relate to the non-linear voltage waveform of the AC power supply and to certain inherent electrical characteristics of the motor that affect current draw from the power supply, which contribute to reduced power factor and motor efficiency. What is needed is a motor control scheme that addresses these challenges.

BRIEF DESCRIPTION OF THE DRAWINGS

The drawings described herein are for illustration purposes only and are not intended to limit the scope of this disclosure in any way.

SUMMARY

Figure 1:
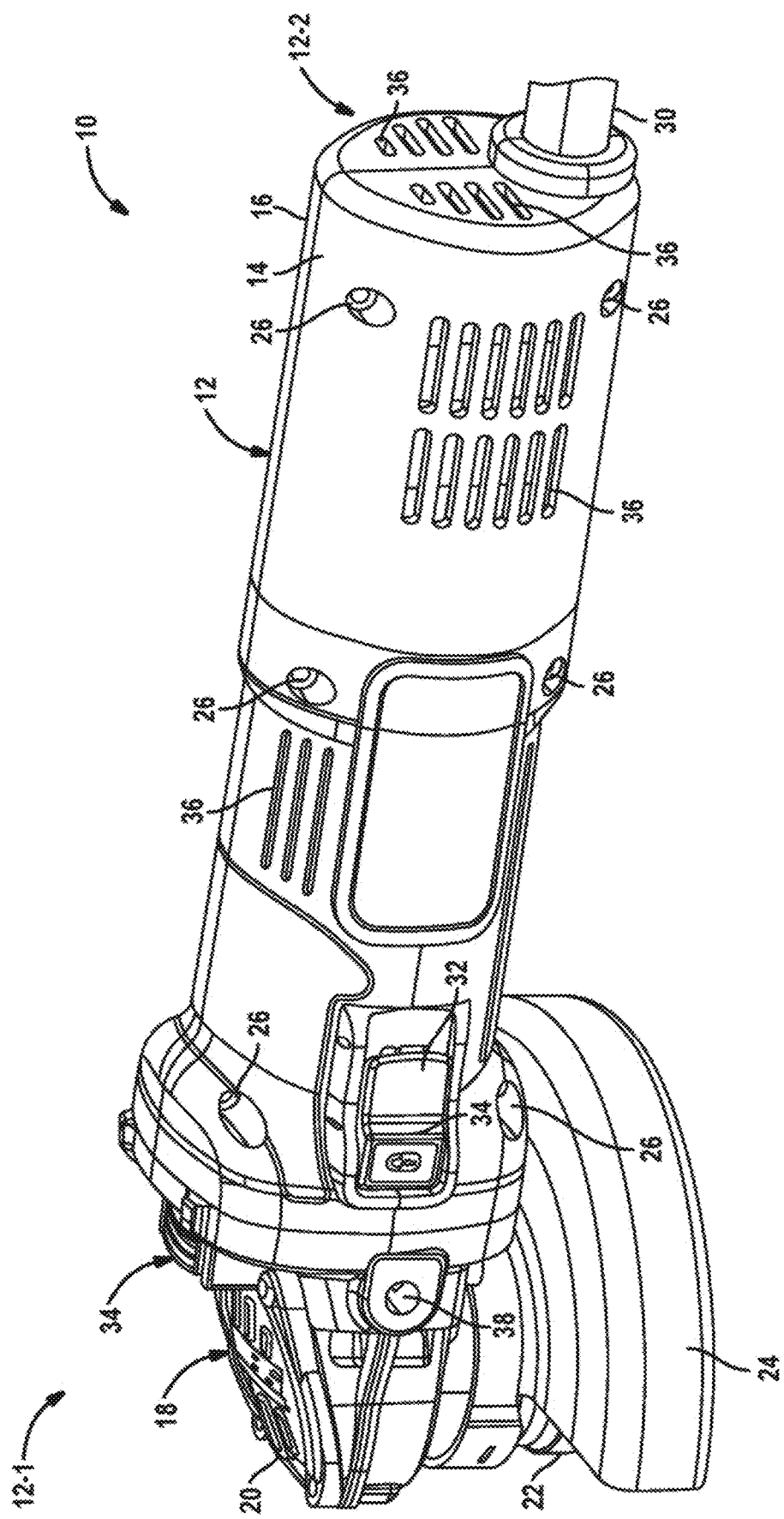
FIG. 1 depicts an exemplary perspective view of a power tool, according to an embodiment.

According to an embodiment of the invention, a power tool is provided including a housing, and a brushless DC (BLDC) motor arranged within the housing and having a stator and a rotor rotatably disposed within the stator. In an embodiment, the power tool further includes a rectifier configured to receive an alternative current from an alternating current (AC) power supply and output a rectified signal supplied to a DC power bus, and an inverter circuit having a motor switches connected electrically between the DC power bus and the motor and operable to deliver electric power from the DC power bus to the motor. In an embodiment, the power tool further includes a control module configured to control a switching operation of the power switches to regulate supply power from the power supply to the motor. In an embodiment, the control module is configured to halt or reduce the switching operation of the power switches between a first threshold prior to a zero-crossing of the AC power supply voltage waveform and a second threshold after the zero-crossing of the AC power supply voltage waveform.

In an embodiment, a back-electromagnetic force (back-EMF) voltage of the motor exceeds the voltage on the DC power bus within a region of the DC power bus voltage waveform between the first threshold and the second threshold, and the controller prevents or significantly reduces flow of current from the motor to the DC power bus, or braking of the motor, between the first threshold and the second threshold.

In an embodiment, the control module is configured to set a pulse-width modulated (PWM) duty cycle of the inverter circuit in accordance to a target rotational speed of the motor.

In an embodiment, the control module is configured to reduce the PWM duty cycle to zero between the first threshold and the second threshold. Alternatively, the control module may reduce the PWM duty cycle to a low value (e.g., up to 30% of the set PWM duty cycle) between the first threshold and the second threshold.

In an embodiment, the control module is configured to detect an actual rotational speed of the motor and set the PWM duty cycle as a function of the difference between the target rotational speed and the actual rotational speed.

In an embodiment, a capacitor is arranged across the DC power bus. In an embodiment, capacitor has a capacitance value that is sufficiently small so that the voltage of the back-electromagnetic force (back-EMF) of the motor exceeds the voltage on the DC power bus within a region of the DC power bus voltage waveform between the first threshold and the second threshold.

In an embodiment, the first and second thresholds correspond to voltage values of at least one of the DC power bus or the AC power supply.

In an embodiment, the first threshold is on the rising portion of the DC bus voltage and the second threshold is on the falling portion of the DC bus voltage. In an embodiment, the first threshold corresponds to a smaller voltage value on the DC bus voltage waveform than the second threshold.

In an embodiment, the first and second thresholds correspond to timing values between and after a zero-crossing of the AC power supply.

In an embodiment, the first and second thresholds are predetermined values.

In an embodiment, the controller is configured to calculate or monitor at least one of a back-EMF voltage of the motor or the rotational speed of the motor and set the first and second thresholds as a function of the back-EMF voltage or the rotational speed of the motor.

According to another aspect/embodiment of the invention, a power tool is provided including a housing and a brushless DC (BLDC) motor arranged within the housing and having a stator and a rotor rotatably disposed within the stator. In an embodiment, the power tool further includes a rectifier configured to receive an alternative current from an alternating current (AC) power supply and output a rectified signal supplied to a DC power bus, and an inverter circuit having motor switches connected electrically between the DC power bus and the motor and operable to deliver electric power from the DC power bus to the motor. In an embodiment, the power tool further includes a control module configured to control a switching operation of the power switches to regulate supply power from the power supply to the motor. In an embodiment, the control module is configured to control the switching operation of the power switches so as to, within a half cycle of the AC power supply voltage waveform, increase current draw from the power supply from a first threshold at or after a first zero-crossing of the half cycle up to a second threshold, and reduce current draw from the power supply from the second threshold up to a third threshold at or prior to a second zero-crossing of the half cycle.

In an embodiment, the second threshold is between the first threshold and a peak of the half cycle.

In an embodiment, the control module is configured to set a pulse-width modulated (PWM) duty cycle of the inverter circuit in accordance to a target rotational speed of the motor.

In an embodiment, the control module is configured to set the PWM duty cycle to zero between the first zero-crossing of the half cycle and the first threshold, and between the third threshold and the second zero-crossing of the half cycle.

In an embodiment, the control module is configured to scale the PWM duty cycle to a higher value between the first and second thresholds, and to a lower value between the second and third thresholds.

In an embodiment, the control module is configured to scale a conduction band corresponding to phases of the motor to a higher value between the first and second thresholds, and to a lower value between the second and third thresholds.

DETAILED DESCRIPTION

The following description illustrates the claimed invention by way of example and not by way of limitation. The description clearly enables one skilled in the art to make and use the disclosure, describes several embodiments, adaptations, variations, alternatives, and uses of the disclosure, including what is presently believed to be the best mode of carrying out the claimed invention. Additionally, it is to be understood that the disclosure is not limited in its application to the details of construction and the arrangements of components set forth in the following description or illustrated in the drawings. The disclosure is capable of other embodiments and of being practiced or being carried out in various ways. Also, it is to be understood that the phraseology and terminology used herein is for the purpose of description and should not be regarded as limiting.

FIG. 1 depicts an example power tool 10. In this example embodiment, the power tool 10 comprises a housing 12 having an elongated shape. A user can grasp the power tool 10 by placing the palm of the user's hand over and around the housing 12. An output member 18 is positioned at one end 12-1 of the housing 12 and comprises a gearset 20 that drives a rotating disk 22. In this example embodiment, the rotating disk 22 comprises a grinder disk.

The rotating disk 22 may be removed and replaced with a new rotating disk. For example, a user of the power tool 10 may replace the existing rotating disk 22 with a new rotating disk after the existing rotating disk 22 wears out. An adjustable guard 24 may cover at least a portion of the rotating disk 22 to obstruct sparks and debris generated during operation of the power tool 10.

The housing 12 may enclose an electric motor 28 (described below with reference to FIG. 2) near the end 12-1 of the housing. The housing 12 may further include a first portion 14 and a second portion 16. The first portion 14 and the second portion 16 may be secured together with screws 26, and enclose electronic circuit components that drive the motor 28. A power cord 30 is connectable to an AC power supply and is positioned at an opposite end 12-2 of the housing 12. The power cord 30 provides power to the electric motor 28 and the electronic circuit components of the power tool 10. The power cord 30 may be coupled to any suitable AC power supply compatible with the operating range of the power tool motor, for example, 120V AC mains in the US, or 230V AC mains in Europe. The power supply may also be a power generator.

The housing 12 may further support a power on/off switch 32 and a spindle lock switch 34. Operating the power on/off switch 32 in ON and OFF positions turns the electric motor 28 ON or OFF, respectively. Pressing and holding the spindle lock switch 34 enables the user to change the rotating disk 22. A plurality of narrow slot openings 36 of the housing 12 and/or the first 14 and second 16 portions allow for venting of the electric motor 28 and the electronic circuit components. The one end 12-1 of the housing 12 also includes a threaded opening 38 for selectively attaching a side-handle (not shown) to enable two-handed operation.

While the present description is provided with reference to a grinder, it is readily understood that the broader aspects of the present disclosure are applicable to other types of power tools, including but not limited to sander, drill, impact driver, tapper, fastener driver, and saw. For example, the power tool 10 may include a chuck that is configured to receive a drill bit or a screw driver bit, thereby allowing the power tool 10 to be used as a power drill or a power screw driver. In another example embodiment, the output member 18 may be removed and replaced with another output member that may be more suitable for a drill, a screw driver, or any other power tool.

Figure 2:
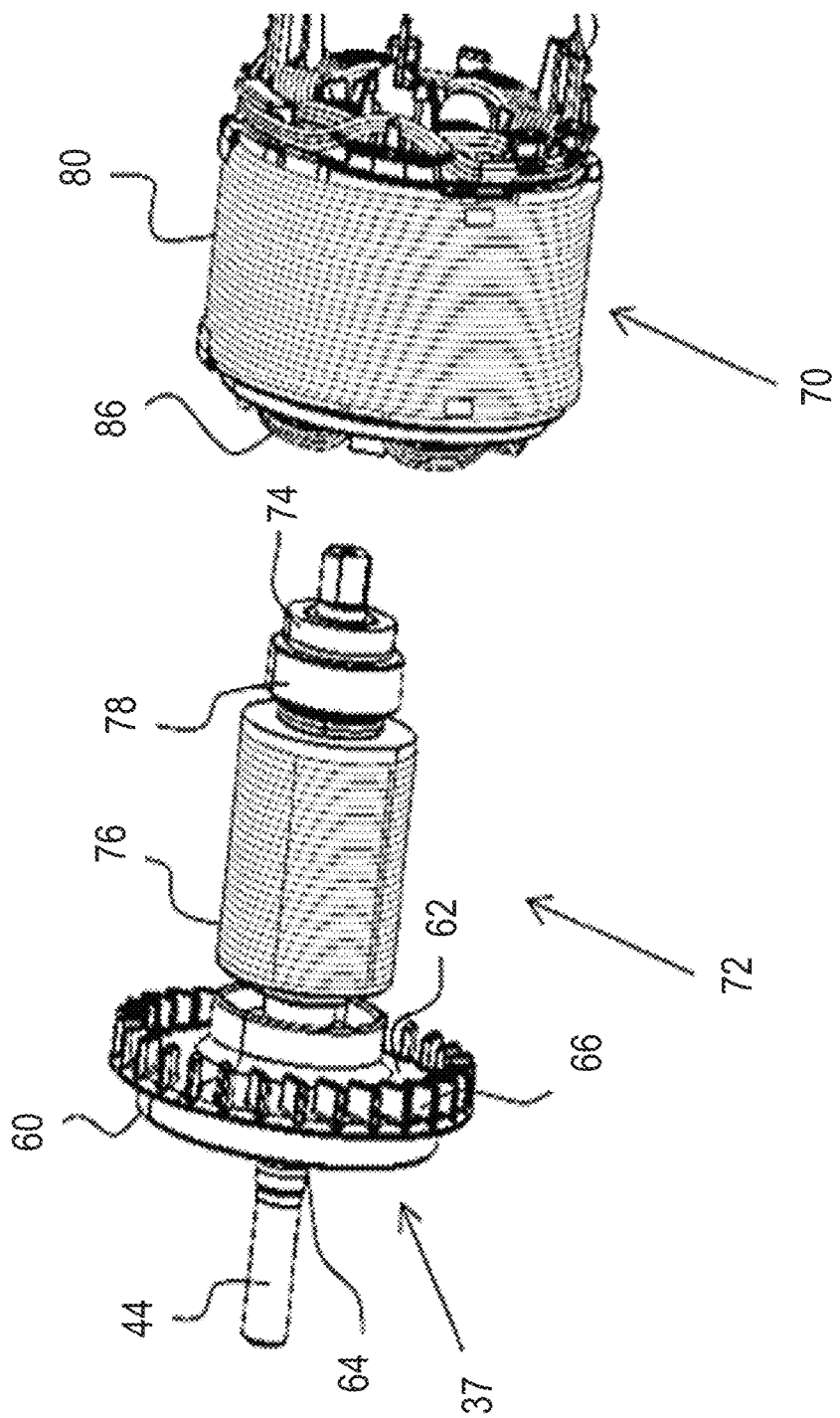
FIG. 2 depicts an exemplary exploded view of a brushless DC motor, according to an embodiment.

FIG. 2 depicts a perspective exploded view of the motor 28, according to an embodiment. In this embodiment, motor 28 is a three-phase brushless DC (BLDC) motor having a can or motor housing 29 sized to receive a stator assembly 70 and a rotor assembly 72.

In an embodiment, rotor assembly 72 includes a rotor shaft 44, a rotor lamination stack 76 mounted on and rotatably attached to the rotor shaft 44, a rear bearing 78 arranged to axially secure the rotor shaft 44 to the motor housing 29, a sense magnet ring 74 attached to a distal end of the rotor shaft 44, and fan 37 also mounted on and rotatably attached to the rotor shaft 44. In various implementations, the rotor lamination stack 76 can include a series of flat laminations attached together via, for example, an interlock mechanical, an adhesive, an overmold, etc., that house or hold two or more permanent magnets (PMs) therein. The permanent magnets may be surface mounted on the outer surface of the lamination stack 76 or housed therein. The permanent magnets may be, for example, a set of four PMs that magnetically engage with the stator assembly 70 during operation. Adjacent PMs have opposite polarities such that the four PMs have, for example, an N-S-N-S polar arrangement. The rotor shaft 44 is securely fixed to the rotor lamination stack 76. Rear bearing 78 provide longitudinal support for the rotor 74 in a bearing pocket (not shown) that secures the motor to the tool housing 12 or a motor housing (not shown).

In an embodiment, fan 37 of the rotor assembly 72 includes a back plate 60 having a first side 62 facing the motor case 16 and a second side 64. A plurality of blades 66 extend axially outwardly from first side 62 of the back plate 60. Blades 66 rotate with the rotor shaft 44 to generate an air flow. When motor 28 is fully assembled, fan 37 is located at or outside an open end of the motor 28.

In an embodiment, stator assembly 70 includes a generally cylindrical lamination stack 80 having center bore configured to receive the rotor assembly 72. Lamination stack 80 further includes a plurality of stator teeth on which stator coil windings 86 are wound. The stator coil windings 86 are wound in three phases and coupled through a controllable switching arrangement circuit to a power supply, as described below. Energizing the respective phases of the stator coil windings 86 causes the rotor assembly 72 to rotate inside the stator assembly 70.

Figure 3:
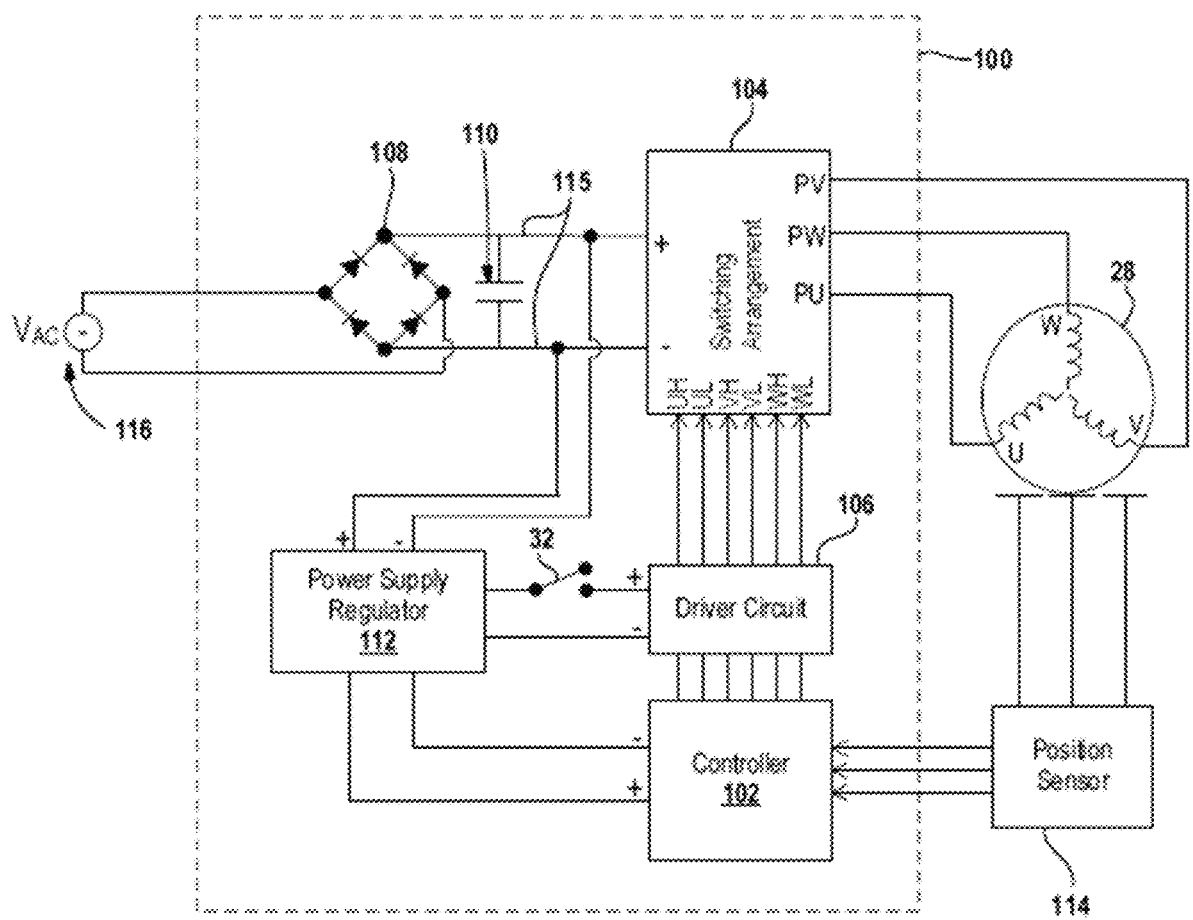
FIG. 3 depicts an exemplary block diagram for a motor control system, according to an embodiment.

FIG. 3 depicts a schematic that illustrates an example of a motor control system 100 that may be employed by the power tool 10. The motor control system 100 is comprised generally of a controller 102, a switching arrangement (also referred to as an inverter circuit) 104, a driver circuit 106, a rectifier 108, and a DC bus capacitor 110, and a power supply regulator 112. The motor control system 100 may further include position sensors 114, such as Hall Effect sensors that are configured to detect rotational motion of the electric motor 28 and generate a signal indicative of the rotational motion. The signal may have a periodic waveform whose magnitude may vary in accordance with the rotational position of the electric motor 28. It should be noted, that other types of positional sensors may be alternatively utilized and should not be limited to Hall-effect sensors.

An AC power supply 116 delivers an alternating current to the rectifier 108 through, for example, the power cord 30. The rectifier 108 converts the alternating current into a direct current that is outputted to a DC bus 115 (i.e., power line/bus). The output of the rectifier 108 may be a pulsating DC signal and not a pure DC signal.

The DC bus capacitor 110 is electrically connected in parallel with the rectifier 108 on the DC bus line 115. The switching arrangement 104 is coupled to DC bus 115 line and receives rectified voltage from the rectifier 108 and the DC bus capacitor 110. The switching arrangement 104 includes a plurality of motor switches that, when switched on, deliver the DC current to the electric motor 28. The motor switches may be IGBTs or FETs. The switching arrangement 104 may be further defined as a three-phase inverter bridge although other arrangements are contemplated by this disclosure.

The driver circuit 106 interfaces with the motor switches of switching arrangement 104. The driver circuit 106 controls the state of the motor switches. In the example embodiment, the driver circuit 106 is shown as being separate from the switching arrangement 104. Alternatively, the driver circuit 106 and the switching arrangement 104 may be a single integrated circuit which may be commercially available from various manufactures. For example, the switching arrangement 104 and the driver circuit 106 may be a part of an integrated power module. In an embodiment, the switching arrangement 104 includes a series of high-side and low-side semiconductor switches configured as a three-phase inverter circuit as described below.

The controller 102 interfaces with the driver circuit 106 and may generate PWM signals to control the electric motor 28. In this embodiment, the controller 102 receives power from the power supply regulator 112. In an alternate embodiment, the controller 102 may receive power directly from the rectifier 108.

The power supply regulator 112 is electrically connected in parallel with the rectifier 108 and operates to power the driver circuit 106 via the power on/off switch 32. The power on/off switch 32 is positioned between the power supply regulator 112 and the driver circuit 106.

When the power on/off switch 32 is switched to the ON-position, the driver circuit 106 receives power from the power supply regulator 112. When the driver circuit 106 receives power, the driver circuit 106 is able to control the state of the motor switches and the electric motor 28 is on.

Conversely, when the power on/off switch 32 is switched to the OFF-position, the driver circuit 106 does not receive power from the power supply regulator 112. When the driver circuit 106 does not receive power, the driver circuit 106 is not able to control the state of the motor switches and the electric motor 28 is off.

In the illustrated example, the power on/off switch 32 is electrically connected between the power supply regulator 112 and the driver circuit 106. Thus, the current being drawn by the electric motor 28 does not pass through the power on/off switch 32. The current passing through the power on/off switch 32 is the current being drawn by the driver circuit 106 and the current being drawn by the driver circuit 106 is lower than the current being drawn by the electric motor 28. It must be understood, however, that in an alternative embodiment, the on/off switch 32 may be a current-carrying switch disposed, for example, on the DC bus line 115 between the rectifier 108 and the switching arrangement 104.

In an embodiment, the DC bus capacitor 110 may be a link capacitor having a relatively small capacitance and does not significantly smoothen the full-wave rectified AC voltage, but rather removes the high frequency noise from the bus voltage.

Figure 4:
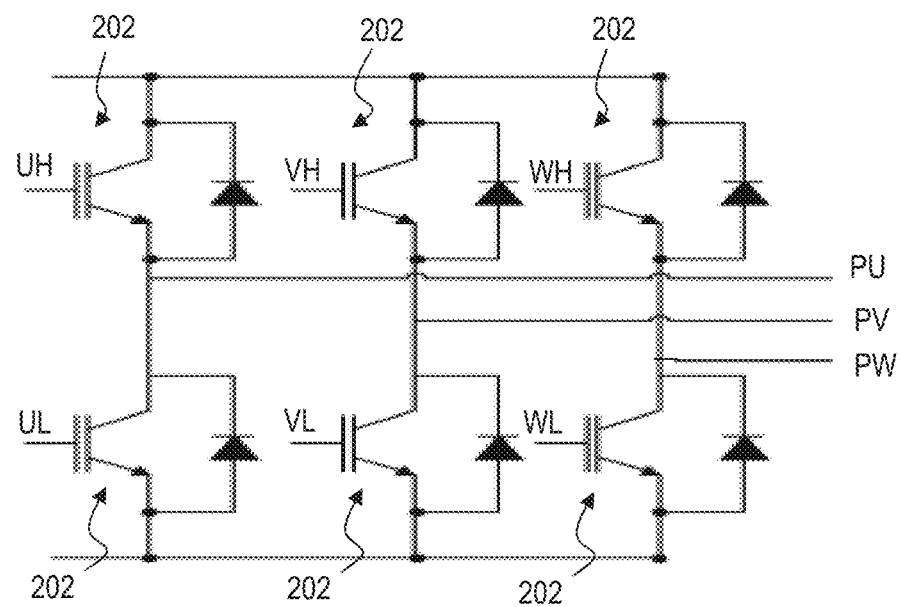
FIG. 4 depicts an exemplary switching arrangement circuit configured as a three-phase inverter bridge circuit, according to an embodiment.

FIG. 4 depicts an exemplary switching arrangement circuit 104 configured as a three-phase inverter bridge circuit, according to an embodiment. As shown herein, the three-phase inverter bridge circuit includes three high-side power switches and three low-side power switches 202. The power switches 202 in this embodiment are Insulated-Gate Bipolar Transistors (IGBTs), although it is understood that other types of power switches such as Field-Effect Transistors (FETs) may alternatively be utilized. In an embodiment, for high power/high voltage power tool applications, such as those driven by an AC mains power supply, IGBTs may be more suitable. The gates of the high-side switches driven via drive signals UH, VH, and WH, and the gates of the low-side switches are driven via drive signals UL, VL, and WL. In an embodiment, the collectors of the low-side switches are coupled to the emitters of the high-side switches to output power signals PU, PV, and PW for driving the respective phases of the motor windings 86.

Figure 5:
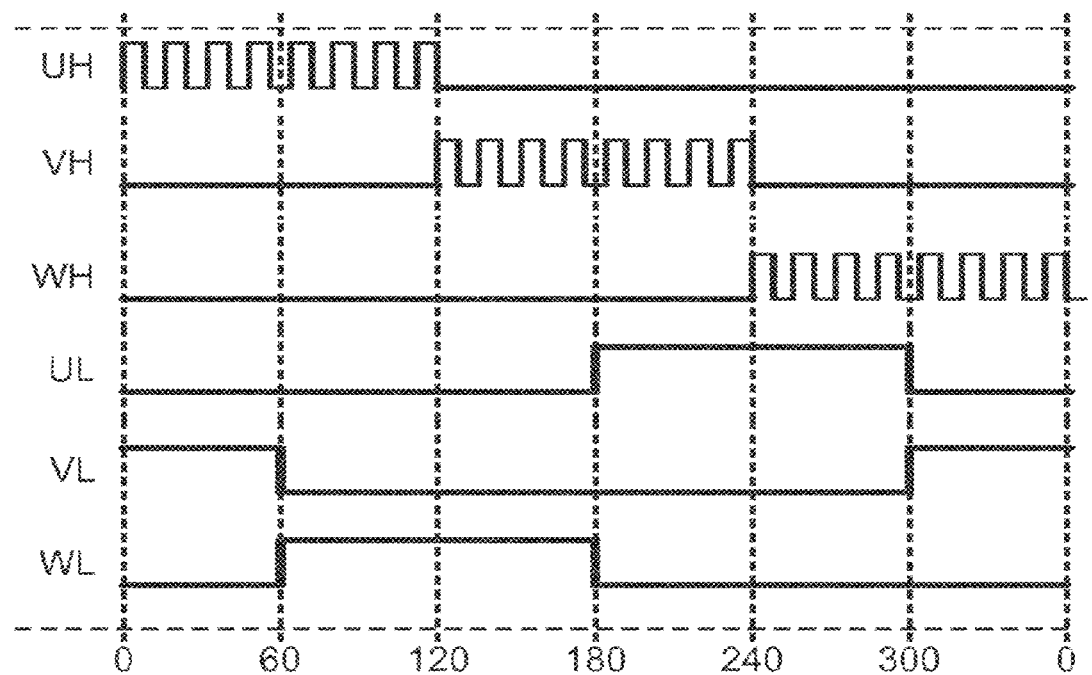
FIG. 5 depicts an exemplary waveform diagram of a pulse-width modulation (PWM) drive sequence of the three-phase inventor bridge circuit of FIG. 4 within a full 360 degree conduction cycle, according to an embodiment.

FIG. 5 depicts an exemplary waveform diagram of a pulse-width modulation (PWM) drive sequence of the three-phase inventor bridge circuit of FIG. 4 within a full 360 degree conduction cycle. As shown in this figure, within a full 360° cycle, each of the drive signals associated with the high-side and low-side power switches is activated during a 120° conduction band ("CB"). In this manner, each associated phase of the BLDC 202 motor is energized within a 120° CB by a pulse-width modulated voltage waveform that is controlled by the control unit 208 as a function of the desired motor 28 rotational speed. For each phase, the high-side switch is pulse-width modulated by the control unit 208 within a 120° CB. During the CB of the high-side switch, the corresponding low-side switch is kept low, but one of the other low-side switches is kept high to provide a current path between the power supply and the motor windings. The control unit 208 controls the amount of voltage provided to the motor, and thus the speed of the motor, via PWM control of the high-side switches.

It is noted that the controller 102 may set the PWM duty cycle based on a target motor speed as determined from an input unit (e.g., power tool trigger switch or speed dial). Additionally and/or alternatively, the controller 102 may set the PWM duty cycle via a close-loop speed control technique, where the controller 102 adjusts the PWM duty cycle in order to maintain the target motor speed as load is applied to the power tool. In an embodiment, the controller 102 may monitor and/or calculate the actual rotational speed of the motor, compare the actual speed to the target motor speed, and adjust the set PWM duty cycle as a function of the difference between the target speed and the actual speed until the actual speed matches the target motor speed.

Figure 6A:
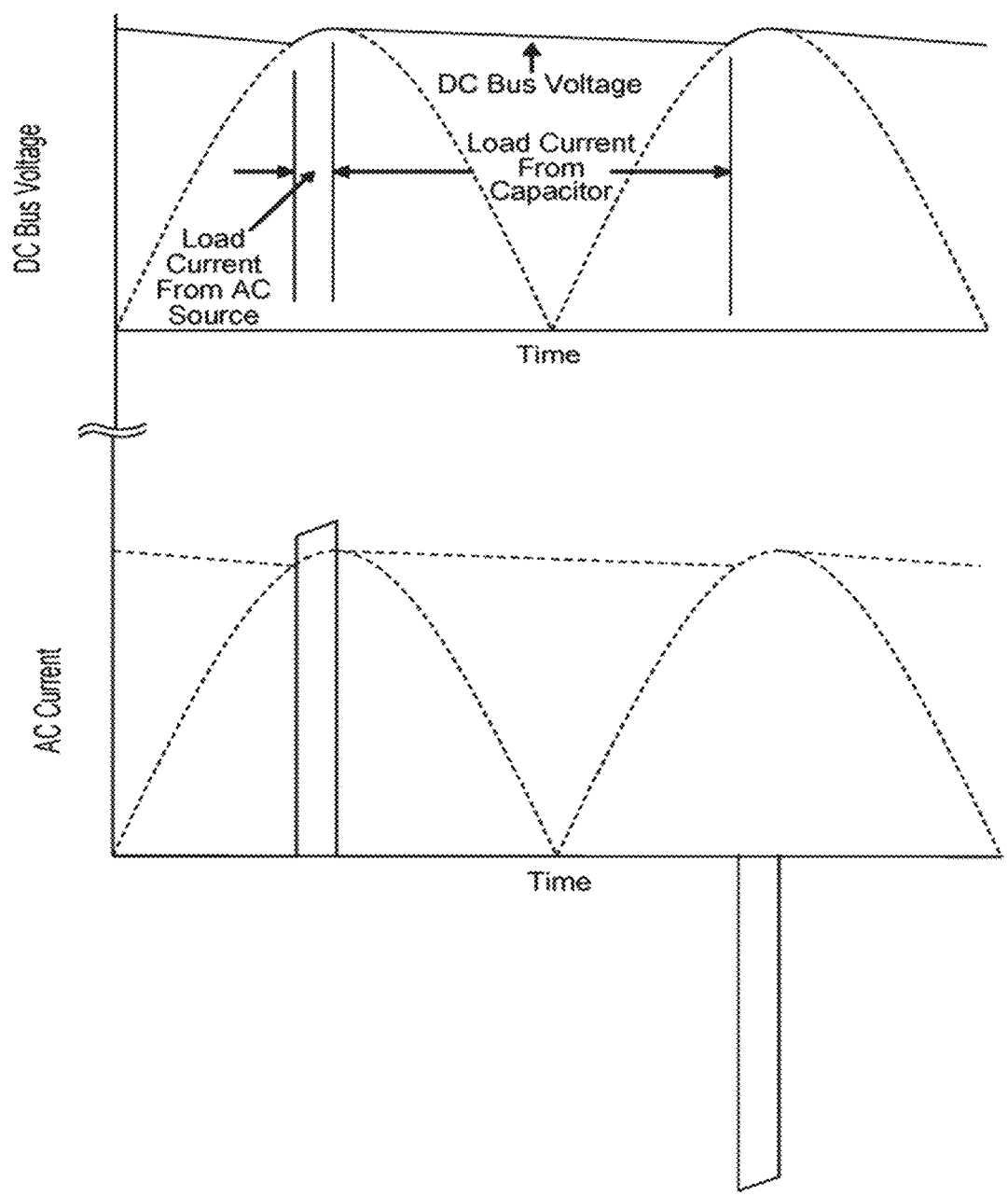
FIGS. 6A-6C depict bus voltage and AC line current waveform diagrams for an exemplary small value DC bus capacitor, an exemplary medium value DC bus capacitor, and an exemplary large value DC bus capacitor, respectively, according to an exemplary embodiment.
Figure 6B:
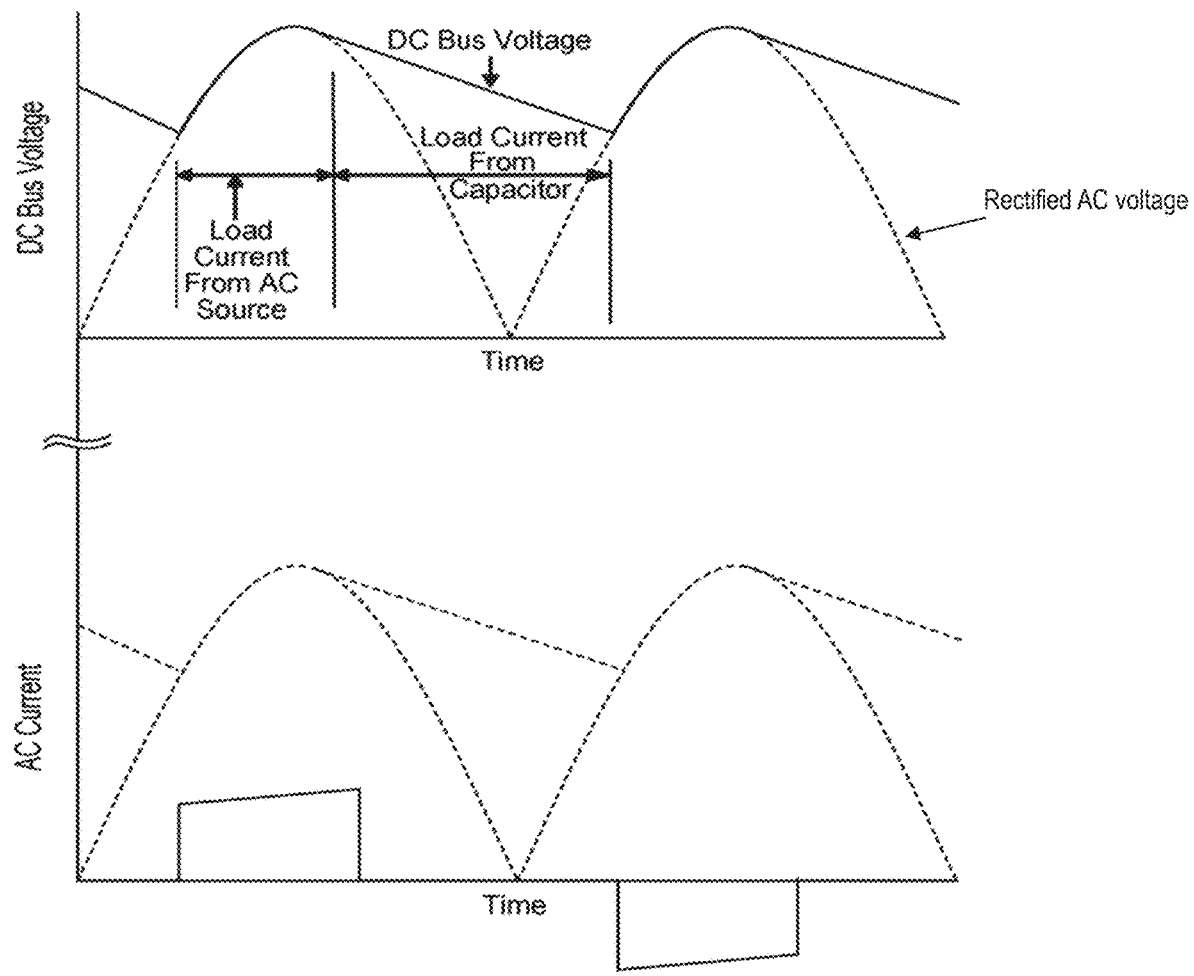
Figure 6C:
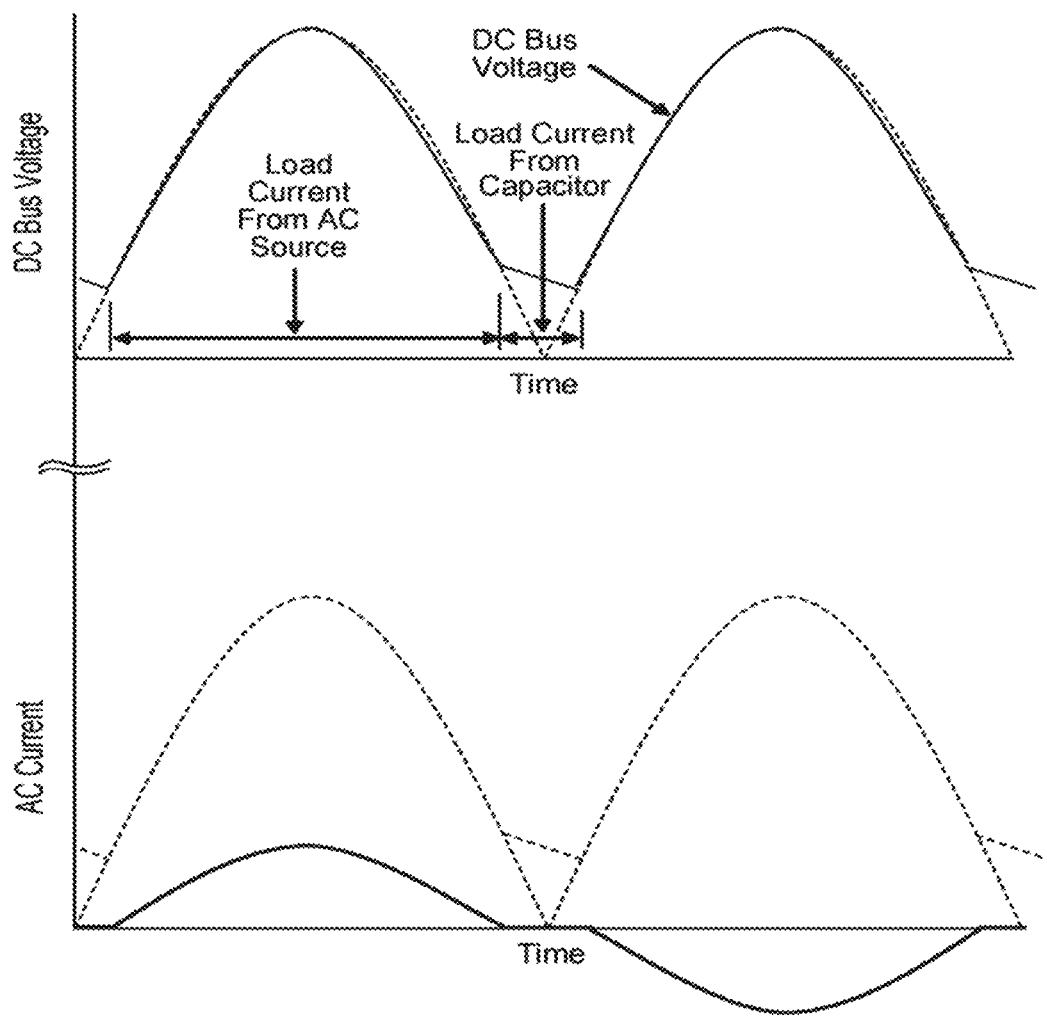

FIGS. 6A-6B highlights the advantages of using a relatively small DC bus capacitor 110 in the power tool 10. FIG. 6A, in an embodiment, depicts the voltage waveform using a relatively large DC bus capacitor 110 (e.g., approximately 400 to 1000 µF) and the associated current waveform. FIG. 6B depicts the voltage waveform using a relatively mid-sized DC bus capacitor 110 (e.g., approximately 50 to 200 µF) and the associated current waveform. FIG. 6C depicts the voltage waveform using a very small DC bus capacitor 110 (e.g., approximately 10 to 30 µF) and the associated current waveform. It is noted that these DC bus capacitor values depend on many factors, most notably the power tool power output requirement. It is noted that exemplary capacitor values provided herein are implemented and tested in conjunction with a circuit as shown in FIG. 2 with max power out of 1.5 to 2 kW.

As shown in FIG. 6A, when using a large DC bus capacitor 110, the current is drawn from the DC bus capacitor 110 for a large portion of each cycle during the capacitor discharge. Thus, current drawn from the AC power supply during each cycle occurs within a small window, which creates a significant current spike. To obtain a constant RMS current of, for example, 10 A from the AC power supply, the current level within the small window increases substantially, which creates the current spikes.

The current spikes in this arrangement are undesirable for two reasons. First, the power factor of the tool becomes low, and the harmonic content of the AC current becomes high. Secondly, for a given amount of energy transferred from the AC source to the tool, the peak value of the current will be high. The practical result of this arrangement is that an unnecessarily large AC circuit breaker is required to handle the current spikes for a given amount of work.

By comparison, as shown in FIG. 6B, when using a mid-sized, the current is drawn from AC power supply within each cycle occurs within a broader time window, which provides a lower harmonic content and higher power factor. Similarly, as shown in FIG. 6C, when using an even smaller capacitor, the current drawn from the capacitor is very small (almost negligible) within each cycle. Thus, the current drawn from the AC power supply is even broader within each cycle. This provides an even lower harmonic context and a much higher power factor in comparison to FIG. 6A.

Additionally, although small DC bus capacitors provide a lower average voltage to the motor control system, it is indeed possible to obtain a higher power output from the AC power supply. In particular, the smaller capacitors enable more power to be drawn from the AC power supply with a lower harmonic context and higher power factor.

For more details on the benefits and advantages of using a small DC bus capacitor in an AC powered or hybrid AC/DC powered power tool system, reference is made to U.S. patent application Ser. No. 14/715,258 filed May 18, 2015, which is incorporated herein by reference in its entirety.

Figure 7:
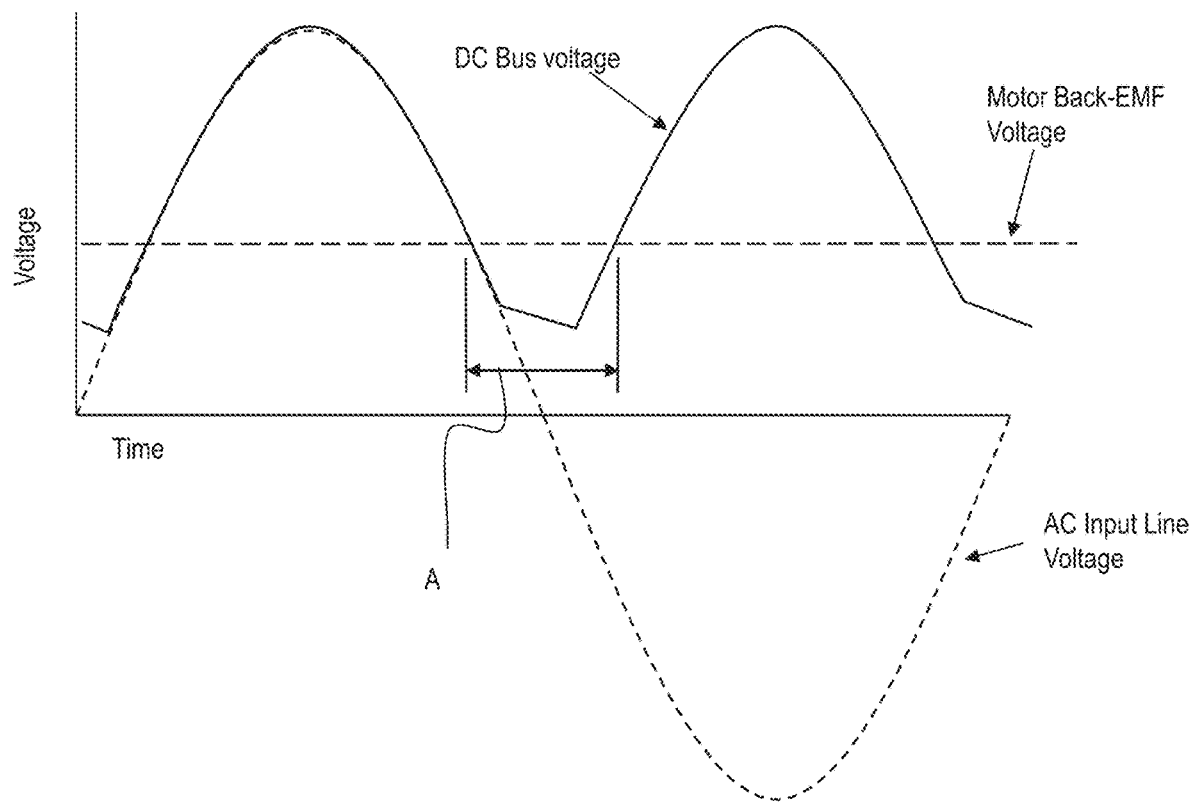
FIG. 7 depicts an exemplary waveform diagram showing the DC bus voltage relative to the motor back-EMF (Electromagnetic Force) voltage, according to an embodiment.
Figure 8:
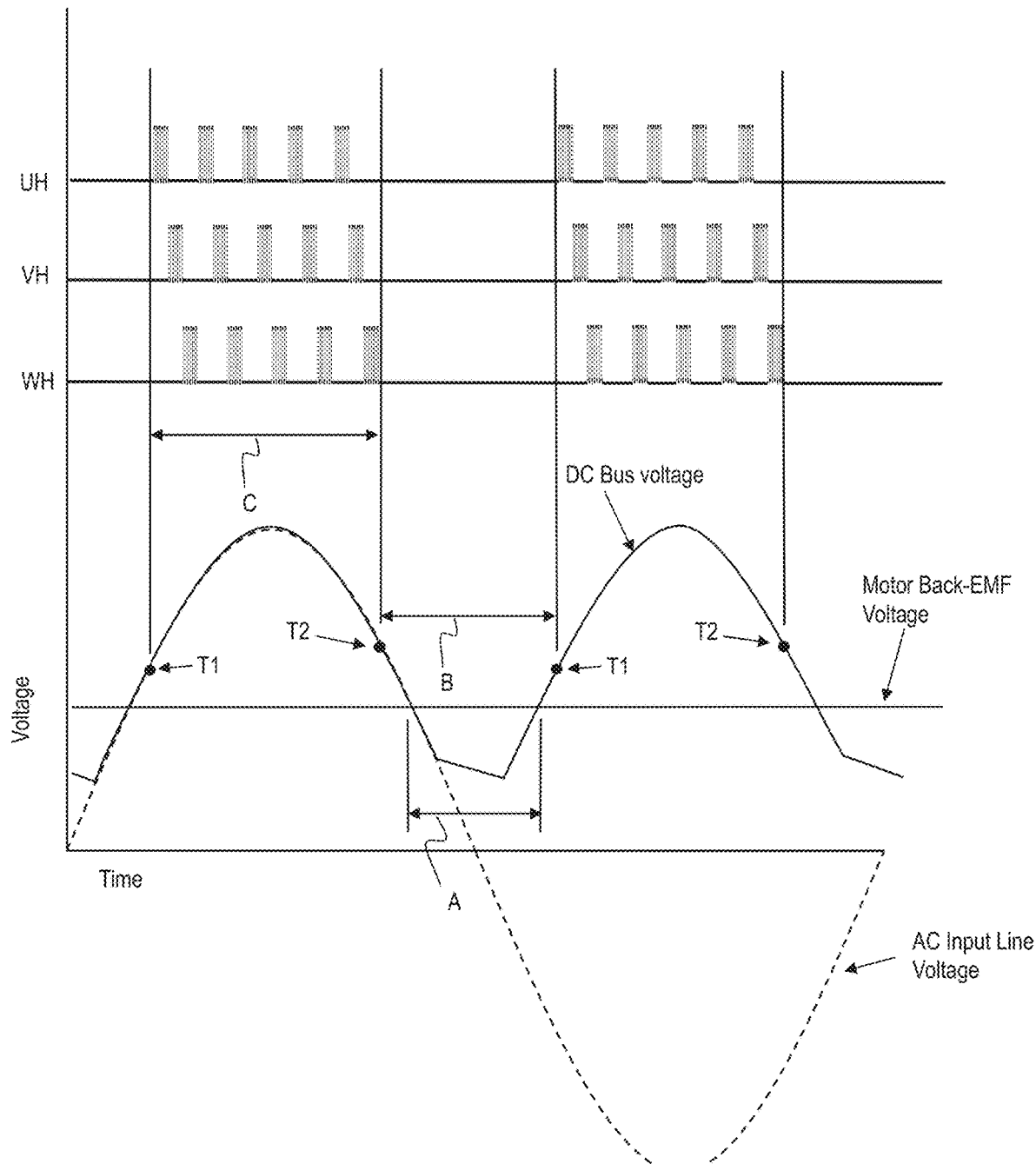
FIG. 8 depicts an exemplary voltage waveform diagram corresponding to an improved PWM drive control scheme, according to an embodiment of the invention.

An aspect of the invention is described herein with reference to the voltage waveform diagram of FIGS. 7 and 8, according to an embodiment.

According to an embodiment, as shown in FIG. 7, when employing a relatively small-value DC bus capacitor, the value of the motor back-EMF voltage may exceed the voltage of the DC bus line in regions near the zero-crossings of the input AC voltage waveform. As understood by persons skilled in the art, the motor back-EMF (Electromagnetic Force) voltage is the voltage induced in the stator windings by the rotation of the rotor within the stator. It must be understood that while the average back-EMF voltage of the motor is illustrated in FIG. 4 as a straight line for illustration purposes, the back-EMF voltage may vary based on many factors, including but not limited to, the load on the motor, the motor speed, etc.

In FIG. 7, the region designated as 'A' corresponds to the area around the zero-crossings of the input AC voltage waveform where the DC bus voltage becomes smaller than the back-EMF voltage of the motor. The DC bus voltage within this region can reach significantly low levels, even approaching zero, depending on the size of the DC bus capacitor. The continuous switching operation of the three-phase inverter circuit 104 within region 'A' of the voltage waveform fails to apply electrical energy from the DC bus line to the motor. Rather, the continuous switching of the inverter circuit 104 within this region may allow the back-EMF current of the motor to flow into the DC bus in reverse, thus applying a braking force to the motor to slow down the motor rotation.

In order to alleviate this problem near the zero-crossings of the AC line voltage waveform, according to an embodiment of the invention, the controller 102 is configured to execute an improved PWM switching technique wherein the controller 102 halts or significantly reduces the PWM switching operation of the inverter circuit 104 at region 'A' the voltage waveform. For example, within region 'A', the controller 102 may set the PWM duty cycle to zero, or to a low duty cycle value that outputs very little power to the motor 28. FIG. 8 depicts an exemplary voltage waveform diagram showing improved PWM drive control scheme that accomplishes this objective, according to an embodiment of the invention.

In this embodiment, the controller 102 is configured to start and stop PWM switching of the inverter circuit 104 based on threshold values T1 and T2. In an embodiment, threshold T1 may be designated on a rising portion of the DC bus voltage following a zero-crossing of the AC input line voltage, and threshold T2 may be designated on a falling portion of the DC bus voltage prior to a subsequent zero-crossing of the AC input line voltage.

It is noted that instead of fully stopping the PWM switching at T2, reducing the set PWM duty cycle to a significantly low value (e.g., duty cycle of up to 30%, or to a value that is up to 30% of the set duty cycle) that does not result in significant motor braking is within the scope of this disclosure.

In an embodiment, threshold values T1 and T2 may be voltage threshold values. In an embodiment, the controller 102 may monitor the DC bus voltage and start and stop the PWM switching operation of the inverter circuit 104 when the DC bus voltage is between threshold voltage values T1 and T2. Alternatively, controller 102 may monitor the AC input line voltage and start and stop the PWM switching operation of the inverter circuit 104 when the absolute value of the AC input line voltage is between threshold voltage values T1 and T2.

In an embodiment, threshold values T1 and T2 may alternatively be timing threshold values. In an embodiment, may determine the zero-crossings (or expected zero-crossings) of the AC line voltage and set the T1 and T2 threshold values accordingly. In an embodiment, the controller 102 may start and stop the PWM switching operation of the inverter circuit 104 between timing threshold values T1 and T2.

In an embodiment, region 'B' of the DC bus voltage between threshold values T2 and T1 may alight with or encompass region 'A'. In other words, threshold values T1 and T2 may be determined based on where the DC bus voltage waveform intersects with the back-EMF voltage waveform, or threshold values T1 and T2 may be determined such that region 'B' is slightly smaller or boarder than region 'A'. The specific designation of T1 and T2 threshold values may depend on various motor design, power tool, and power supply characteristics and requirements.

In an embodiment, for the reasons described later in this disclosure, threshold values T1 and T2 may be set such that the DC bus voltage is greater at threshold T2 than it is at threshold T1. In other words, T1 is closer to its preceding AC line voltage zero-crossing than T2 is to its subsequent AC line voltage zero-crossing.

In an embodiment, values of T1 and T2 may be predetermined and preprogrammed. Alternatively, the controller 102 may actively determine the threshold values T1 and T2 based on a variety of factors. For example, the controller 102 may monitor the back-EMF voltage of the motor and calculate the values of T1 and T2 accordingly. The controller 102 may also calculate the values of T1 and T2 based on the rotational speed of the motor, which may be correlated to the load applied on the power tool. In variable speed tools, the controller 102 may set the values of T1 and T2 based on a desired speed of the motor set in accordance with a variable speed input (e.g., a trigger or a speed dial).

According to an embodiment, as shown in the voltage waveform diagram of FIG. 8, the controller 102 performs a PWM switching operation on the inverter circuit 104 switches via control signals UH, VH, and WH, within region 'C' of the DC bus line between thresholds T1 and T2. Within region 'B' of the DC bus line, the controller 102 temporarily halts the PWM switching operation, or significantly reduces the PWM duty cycle, until the ensuing T1 threshold is reached within a subsequent AC line half cycle. In an embodiment, the controller 102 sets the PWM duty cycle to zero within region 'B'. Further, in an embodiment, the controller 102 may scale the PWM duty cycle outside of region 'B' to a level that outputs the power level required to rotate the motor at the target speed. This scheme prevents flow of current from the motor to the DC bus line at or near the zero-crossings of the AC line voltage.

Figure 9:
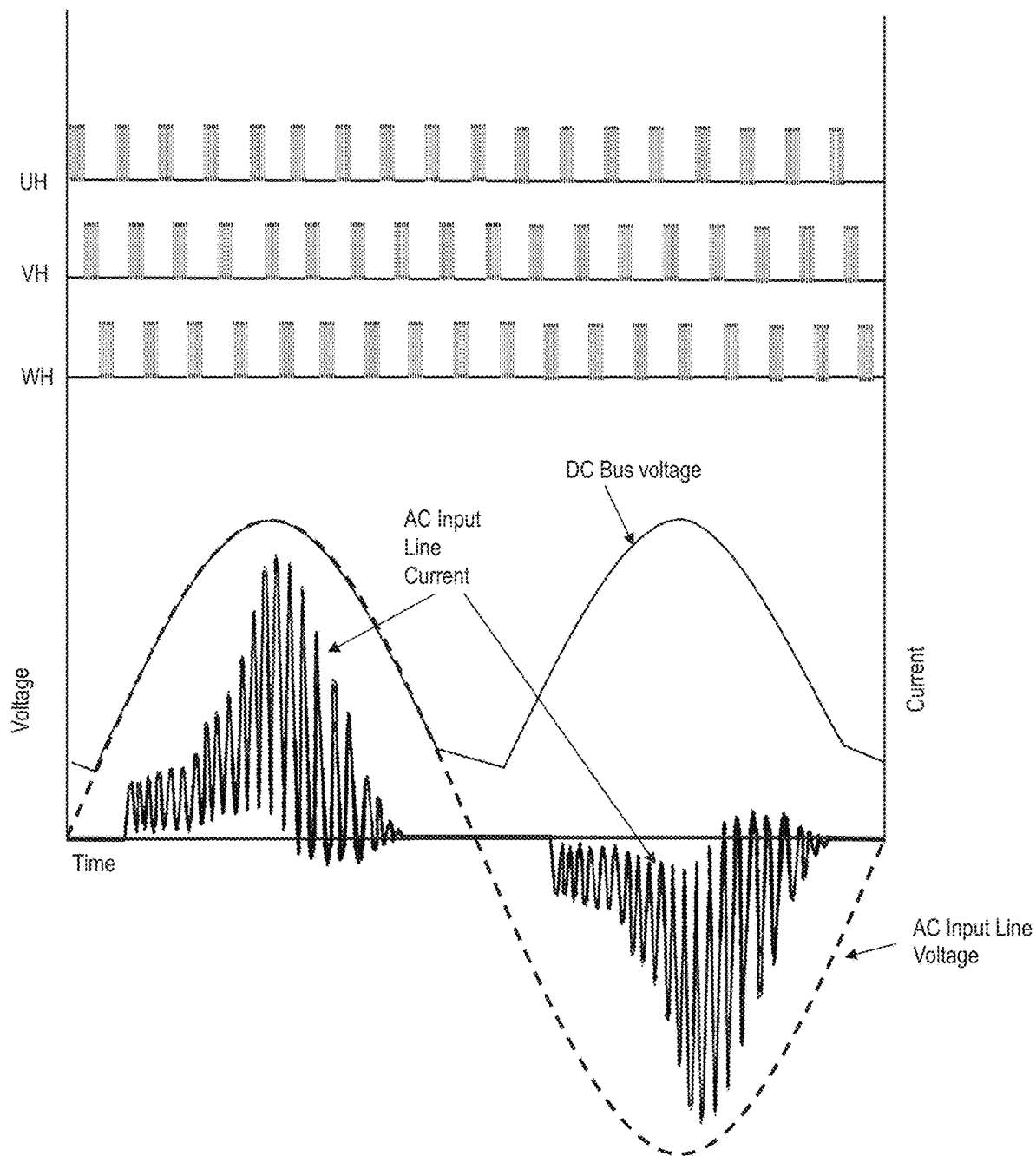
FIG. 9 depicts an exemplary combined voltage-time and current-time waveform diagram depicting the AC input line voltage, the DC bus voltage, the AC input line current, when driving the power tool motor using a conventional PWM switching scheme, according to an embodiment.
Figure 10:
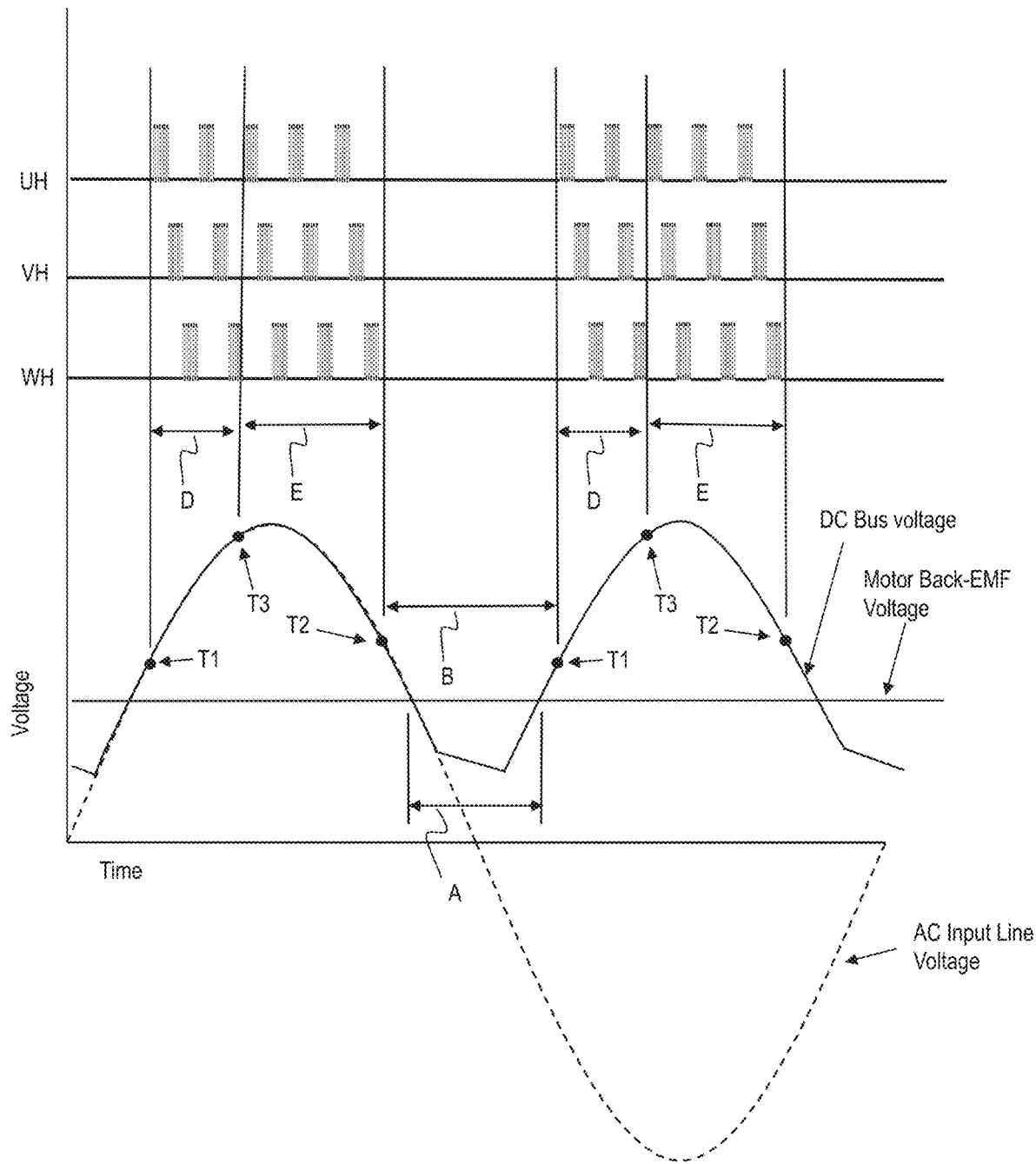
FIG. 10 depicts an exemplary voltage waveform diagram showing an improved PWM drive control scheme, according to an alternative and/or additional embodiment of the invention.
Figure 11:
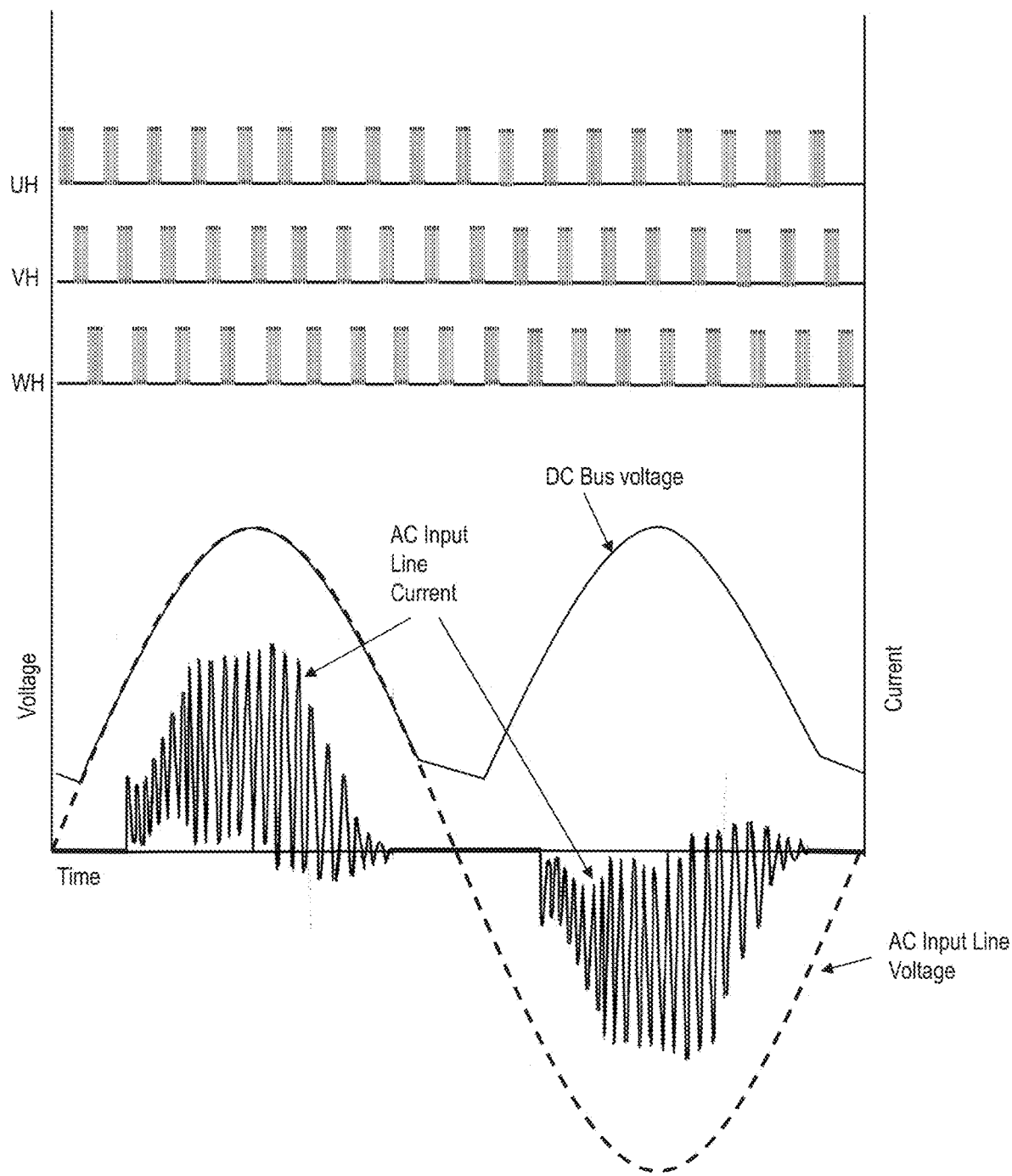
FIG. 11 depicts an exemplary combined voltage-time and current-time waveform diagram depicting the AC input line voltage, the DC bus voltage, the AC input line current, when driving the power tool motor using the improved PWM switching scheme, according to an embodiment.

An alternative and/or additional aspect of the invention is described herein with reference to FIGS. 9-11.

FIG. 9 depicts an exemplary combined voltage-time and current-time waveform diagram including the AC input line voltage, the DC bus voltage, and the AC input line current, when driving the power tool motor using a conventional PWM switching scheme. Due to the inherent inductive characteristics of the motor, the motor applies an inductive load to power supply, causing the AC input line current to lag slightly behind the AC input line voltage (and the DC bus voltage). As the AC input line current and voltage waveforms become out of phase, a smaller and imbalanced window becomes available for current to be drawn from the power supply within each AC line voltage half cycle. This results in large current spikes during the back half of the AC line voltage half cycles, as can be seen in the AC input line current waveform. These spikes adversely affect power factor and the harmonic content of the AC line current waveform.

According to an embodiment, an improved PWM drive control scheme is provided tailored to improving the shape of the AC line current waveform, and thus improving the power factor and harmonic content of the AC line current waveform, as described herein.

In an embodiment, as briefly described above, the controller 102 is configured to shift the AC current waveform such that it becomes more in phase with the AC input line voltage waveform. This is accomplished by setting thresholds T1 and T2 described above such that the DC bus voltage is smaller at threshold T1 in the rising portion of the DC bus voltage waveform following a zero-crossing of the AC input line voltage waveform, than it is at threshold T2 in the falling portion of the DC bus voltage waveform prior to a subsequent zero-crossing of the AC input line voltage waveform. In other words, T1 is closer to its preceding AC line voltage zero-crossing than T2 is to its subsequent AC line voltage zero-crossing. This allows for the motor to begin drawing current sooner within each half cycle, thus shifting the current waveform to the left so it is more in line with the AC input line voltage waveform.

In a further and/or alternative embodiment, the controller 102 is configured to scale and modify the PWM duty cycle such that the duty cycle has a higher value during a first portion of each AC line half cycle (approximately corresponding to the rising portion of the DC bus voltage) than during a second portion the AC line half cycle (approximately corresponding to the falling portion of the DC bus voltage). With this scheme, the controller 102 drives the motor with more power, and draws more current, during the first portion of each AC line half cycle than during the second portion. In an embodiment, the controller 102 scales the PWM duty cycle within the first and second portions within each AC line cycle consistent with the desired average power output for each AC line cycle. The added current draw during the front half of the AC line half cycles balances the AC line current waveform more evenly across the length of the AC line half cycle, providing a more sinusoidal AC current waveform with reduces peak current spikes. This scheme thus significantly improves power factor and the harmonic content of the AC line current waveform.

FIG. 10 depicts an exemplary voltage waveform diagram showing the improved PWM drive control scheme, according to an exemplary embodiment. In this embodiment, the AC waveform is separated to several discrete regions, each with its own scaling factor for power applied. In an exemplary embodiment, an additional voltage or timing threshold T3 is designated between thresholds values T1 and T2.

As described in previous embodiment, between threshold values T2 and T1 (i.e., region 'B' of the voltage waveform), the PWM duty cycle is set to zero.

In an embodiment, the controller 102 is further configured to apply scaling factors to the PWM duty cycle outside of region 'B' such that the duty cycle is higher within region 'D' (between threshold values T1 and T3), than within region 'E' (between threshold values T3 and T2). The scaling of the PWM duty cycle provides more current draw in the beginning portion of each half cycle in order to balance the AC input line current waveform.

In an embodiment, threshold T3 may be designated near the peak of the DC bus voltage waveform half cycle between T1 and the peak, though it may also be designate between the peak and T2. In an embodiment, the controller 102 scales the PWM duty cycle within regions 'D' and 'E' such that the average power within the half cycle supply the desired power to the motor to produce the target rotational speed.

In an exemplary embodiment, the scaling factor applied by the controller 102 to the PWM duty cycle may be set to zero within region 'B', to a value greater than 1 (e.g., 1.1 to 1.3) within region 'D' between thresholds T1 and T3, and to a value less than 1 (e.g., 0.85 to 0.99) within region 'E' between thresholds T3 and T2. Thus, if for example, the average PWM duty cycle as calculated based on the target speed (in open loop), or based on the difference between the rotational speed and the target speed (in closed loop), is to be set to 50%, the controller 102 may set the PWM duty cycle to 0% within region 'B', to 60% within region 'D', and to 48% within region 'E'.

It is noted that while in FIG. 9 the AC line cycle is divided to three regions by way of example, the AC line cycle may be divided to more discrete regions by setting multiple threshold values between thresholds T1 and T2.

FIG. 11 depicts an exemplary combined voltage-time and current-time waveform diagram depicting the AC input line voltage, the DC bus voltage, the AC input line current, when driving the power tool motor according to the improved PWM switching scheme of the invention, according to an embodiment. As shown in this figure, as compared to FIG. 9, the AC input line current is more balanced, closer to a sinusoidal waveform, and more synchronized with the AC line voltage waveform, thus improving power factor and the harmonic content of the AC line current waveform.

The embodiments described above relates to PWM switching technique for controlling the motor speed. According to an alternative and/or additional embodiment of the invention, the same principles described above can be implemented by modifying and scaling the conduction band and/or advance angle of the motor, as described below.

Figure 12:
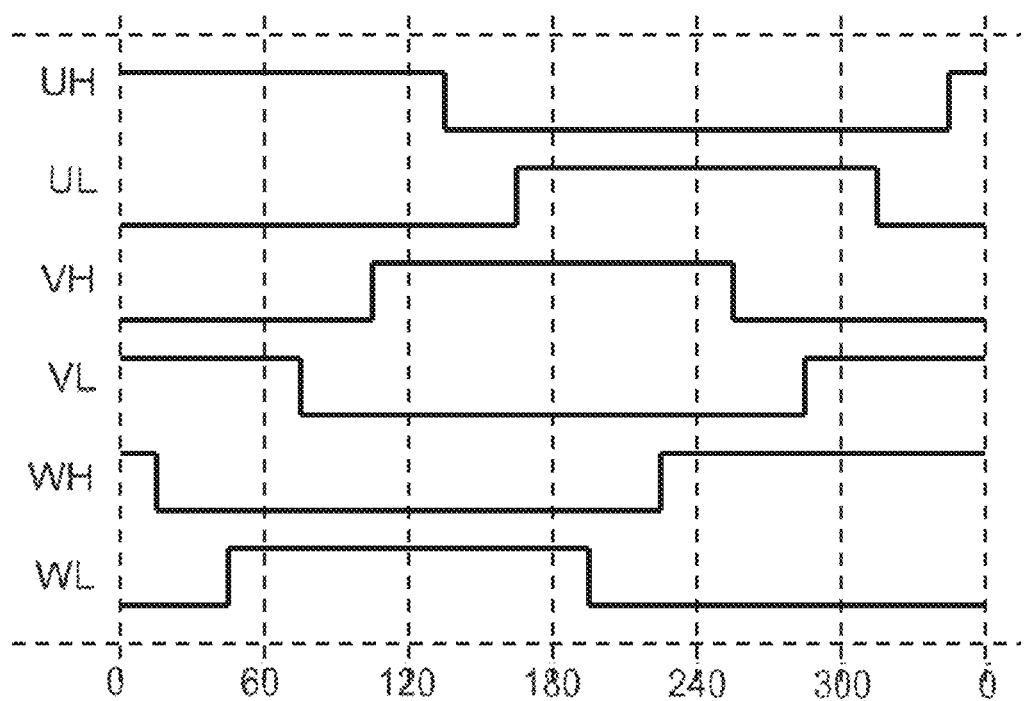
FIG. 12 depicts an exemplary waveform diagram of the drive sequence of the three-phase inventor bridge circuit at a 150 conduction band, according to an embodiment.

Reference is now made PCT Application WO 2015/179318, filed May 18, 2015, which is incorporated herein by reference. This application describes a motor speed control technique using conduction band (CB) and/or advance angle (AA) control. As shown in FIG. 12, the conduction band (also referred to as the conduction angle) of each phase of the motor may be varied from the default 120 degrees to a greater or lesser value (in this example, 150 degrees) to control the amount of electrical energy provided to the motor, and thus the speed of the motor. As understood by those skilled in the art, advance angle (also referred to as the lead angle) is the shift in the phase of the conduction band to account for the motor phase current lagging behind the motor back-EMF voltage due to inherent inductances of the motor. Increasing and decreasing the advance angle may similarly be used to control the speed of the motor. Conduction band and advance angle control may be performed independently or in tandem.

Referring back to FIG. 10, according to an embodiment of the invention, the controller 102 may apply a scaling factor to the conduction band (instead of or in addition to the PWM duty cycle) to obtain a balanced AC line input current. In an exemplary embodiment, controller 102 may set the conduction band to be zero within region 'B'. This has the same effect as setting the PWM duty cycle to zero within this region. In addition, the controller 102 may apply a scaling factor the conduction band within region to 'D' and 'E'. The scaling factor may be a value greater than 1 within region 'D' less than 1 within region 'E'. Consequently, where the conduction band has a default value of 120 degrees, in an exemplary embodiment, the controller 102 may set the conduction band to a value in the range of 130-150 degrees within region D', and to a value in the range of 100-119 degrees within region 'E'. In an embodiment, the controller 102 may do this without scaling the PWM duty cycle, or in conjunction with scaling the PWM duty cycle.

Additionally and/or alternatively, according to an embodiment, the controller 102 may apply a scaling factor to the angle advance within regions 'D' and 'E' (instead of or in addition to the PWM duty cycle and/or the conduction band) to obtain a balanced AC line input current. In an embodiment, the scaling factor may be a value greater than 1 within region 'D' less than 1 within region 'E'. Consequently, where the angle advance has a default value of 30 degrees, in an exemplary embodiment, the controller 102 may set the angle advance to a value in the range of 35-50 degrees within region 'D', and to a value in the range of 10-28 degrees within region 'E'. In an embodiment, the controller 102 may do this without scaling the PWM duty cycle and the conduction band, or in conjunction with scaling the PWM duty cycle and/or the conduction band.

Some of the techniques described herein may be implemented by one or more computer programs executed by one or more processors, controllers and/or control units residing, for example on a power tool. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A power tool comprising:
a housing;
a brushless DC (BLDC) motor arranged within the housing, the motor including a stator and a rotor rotatably disposed within the stator;
a rectifier configured to receive an alternative current from an alternating current (AC) power supply and output a rectified signal supplied to a DC power bus;
an inverter circuit having a plurality of motor switches connected electrically between the DC power bus and the motor and operable to deliver electric power from the DC power bus to the motor;
a control module configured to control a switching operation of the plurality of power switches to regulate supply power from the power supply to the motor over a plurality of successive full cycles of the AC power supply voltage waveform, wherein for each full cycle of the plurality of successive full cycles of the AC power supply voltage waveform, the control module being configured to halt the switching operation of the plurality of power switches to cut off supply of power from the power supply to the motor between a first threshold and a second threshold, wherein the first threshold is between a high peak of the full cycle and a zero-crossing of the full cycle on the AC power supply voltage waveform, and the second threshold is between a low peak of the full cycle and the zero-crossing of the full cycle on the AC power supply voltage waveform; and a capacitor arranged across the DC power bus, the capacitor having a capacitance value such that, within each full cycle of the plurality of full cycles of the AC power supply voltage waveform, the voltage on the DC power bus becomes smaller than a back-electromagnetic force (back-EMF) voltage of the motor within a region of the DC power bus voltage waveform between the first threshold and the second threshold, the first threshold and second threshold corresponding to voltage levels greater than the back-EMF voltage of the motor such that the inverter circuit substantially prevents flow of current from the motor to the power supply within said region of the DC power bus voltage waveform.

2. The power tool of claim 1, wherein the control module is configured to set a pulse-width modulated (PWM) duty cycle of the inverter circuit in accordance to a target rotational speed of the motor.

3. The power tool of claim 2, wherein the control module is configured to set the PWM duty cycle to zero, or reduce the PWM duty cycle to a value that is less than or equal to 30% of the value of the set PWM duty cycle, between the first threshold and the second threshold.

4. The power tool of claim 2, wherein the control module is configured to detect an actual rotational speed of the motor and set the PWM duty cycle as a function of the difference between the target rotational speed and the actual rotational speed.

5. The power tool of claim 1, wherein the first and second thresholds correspond to voltage values of at least one of the DC power bus or the AC power supply.

6. The power tool of claim 1, wherein the second threshold is on the rising portion of the DC bus voltage and the first threshold is on the falling portion of the DC bus voltage.

7. The power tool of claim 6, wherein the first threshold corresponds to a smaller voltage value on the DC bus voltage waveform than the second threshold.

8. The power tool of claim 1, wherein the first and second thresholds correspond to timing values between and after a zero-crossing of the AC power supply.

9. The power tool of claim 1, wherein the first and second thresholds are predetermined values.

10. The power tool of claim 1, wherein the controller is configured to calculate or monitor at least one of a back-EMF voltage of the motor or the rotational speed of the motor and set the first and second thresholds as a function of the back-EMF voltage or the rotational speed of the motor.

11. A power tool comprising:
a housing;
a brushless DC (BLDC) motor arranged within the housing, the motor including a stator and a rotor rotatably disposed within the stator;
a rectifier configured to receive an alternative current from an alternating current (AC) power supply and output a rectified signal supplied to a DC power bus;
an inverter circuit having a plurality of motor switches connected electrically between the DC power bus and the motor and operable to deliver electric power from the DC power bus to the motor;
a control module configured to set a pulse-width modulated (PWM) duty cycle of the inverter circuit to a set value in accordance to a target rotational speed of the motor and control a switching operation of the plurality of power switches accordingly to regulate supply power from the power supply to the motor over a plurality of successive full cycles of the AC power supply voltage waveform, the control module being further configured to, for each full cycle of the plurality of successive full cycles of the AC power supply voltage waveform, reduce the PWM duty cycle to a value that is less than or equal to 30% of the set value between a first threshold and a second threshold, wherein the first threshold is between a high peak of the full cycle and a zero-crossing of the full cycle on the AC power supply voltage waveform and the second threshold is between a low peak of the full cycle and the zero-crossing of the full cycle on the AC power supply voltage waveform; and a capacitor arranged across the DC power bus, the capacitor having a capacitance value such that, within each full cycle of the plurality of full cycles of the AC power supply voltage waveform, the voltage on the DC power bus becomes smaller than a back-electromagnetic force (back-EMF) voltage of the motor within a region of the DC power bus voltage waveform between the first threshold and the second threshold, the first threshold and second threshold corresponding to voltage levels greater than the back-EMF voltage of the motor such that the inverter circuit substantially prevents flow of current from the motor to the power supply within said region of the DC power bus voltage waveform.

12. The power tool of claim 11, wherein the control module is configured to detect an actual rotational speed of the motor and set the PWM duty cycle as a function of the difference between the target rotational speed and the actual rotational speed.

13. The power tool of claim 11, wherein the first and second thresholds correspond to voltage values of at least one of the DC power bus or the AC power supply.

14. The power tool of claim 11, wherein the second threshold is on the rising portion of the DC bus voltage and the first threshold is on the falling portion of the DC bus voltage.

15. The power tool of claim 14, wherein the first threshold corresponds to a smaller voltage value on the DC bus voltage waveform than the second threshold.

16. The power tool of claim 11, wherein the first and second thresholds correspond to timing values between and after a zero-crossing of the AC power supply.

17. The power tool of claim 11, wherein the first and second thresholds are predetermined values.

18. The power tool of claim 11, wherein the controller is configured to calculate or monitor at least one of a back-EMF voltage of the motor or the rotational speed of the motor and set the first and second thresholds as a function of the back-EMF voltage or the rotational speed of the motor.

* * * * *